(12) United States Patent
Whittaker et al.

(10) Patent No.: US 10,964,436 B2
(45) Date of Patent: Mar. 30, 2021

(54) SYSTEM FOR HYDROGEN INJECTION FOR BOILING WATER REACTORS (BWRS) DURING STARTUP / SHUTDOWN

(71) Applicant: GE-Hitachi Nuclear Energy Americas LLC, Wilmington, NC (US)

(72) Inventors: John C Whittaker, Plymouth, MA (US); Angelo Foz Gonzaga, Sunol, CA (US); Paul Y Shu, Sunol, CA (US); Luong C Tran, Sunol, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 146 days.

(21) Appl. No.: 16/239,063

(22) Filed: Jan. 3, 2019

(65) Prior Publication Data
US 2020/0027591 A1  Jan. 23, 2020

Related U.S. Application Data

(62) Division of application No. 13/724,474, filed on Dec. 21, 2012, now Pat. No. 10,229,761.

(51) Int. Cl.
*G21C 9/00* (2006.01)
*G21C 19/303* (2006.01)
*G21C 19/40* (2006.01)

(52) U.S. Cl.
CPC ............. *G21C 9/00* (2013.01); *G21C 19/303* (2013.01); *G21C 19/40* (2013.01)

(58) Field of Classification Search
CPC ...... G21C 9/00; G21C 17/0225; G21C 19/40; G21C 19/303; G21D 3/10; G21D 1/04
See application file for complete search history.

(56) References Cited

U.S. PATENT DOCUMENTS

| | | | |
|---|---|---|---|
| 3,663,725 A | 5/1972 | Pearl | |
| 4,021,299 A | 5/1977 | Rigollot | |
| 5,796,799 A | 8/1998 | Kobayashi et al. | |
| 2004/0042579 A1 | 3/2004 | Bolton et al. | |
| 2011/0158879 A1 | 6/2011 | Shu et al. | |

(Continued)

FOREIGN PATENT DOCUMENTS

| | | |
|---|---|---|
| EP | 1 168 371 A1 | 1/2002 |
| JP | S5088494 A | 7/1975 |

(Continued)

OTHER PUBLICATIONS

Abe, Ayumi, et al. "Mitigation of SCC initiation on BWR core internals by means of hydrogen water chemistry during start-up." Nuclear science and engineering 149.3 (2005): 312-324. (Year: 2005).*

(Continued)

*Primary Examiner* — Lily C Garner
(74) *Attorney, Agent, or Firm* — Harness, Dickey & Pierce, P.L.C.

(57) ABSTRACT

A system for injecting hydrogen into Boiling Water Reactor (BWR) reactor support systems in operation during reactor startup and/or shutdown. The system the hydrogen injection system includes at least one hydrogen source, flow control equipment, and pressure control equipment. The pressure control equipment being configured to regulate a pressure of a hydrogen flow between the at least one hydrogen source and the at least one first BWR support system based upon an operating pressure of the at least one first BWR support system.

20 Claims, 3 Drawing Sheets

(56) References Cited

U.S. PATENT DOCUMENTS

| | | | |
|---|---|---|---|
| 2012/0260693 A1* | 10/2012 | DeMore | F04D 25/16 |
| | | | 62/644 |
| 2013/0036833 A1 | 2/2013 | Nakada | |
| 2014/0241907 A1* | 8/2014 | Grynning | F04B 49/007 |
| | | | 417/53 |

FOREIGN PATENT DOCUMENTS

| | | |
|---|---|---|
| JP | S54-116595 A | 9/1979 |
| JP | S54126894 A | 10/1979 |
| JP | 02-116795 | 6/1992 |
| JP | 06-249996 | 12/1995 |
| JP | 08-122491 | 5/1996 |
| JP | 10-090485 | 10/1999 |
| JP | H11-304992 | 11/1999 |
| JP | 2004525294 A | 8/2004 |
| JP | 2006-029940 A | 2/2006 |
| JP | 2006162522 A | 6/2006 |
| JP | 2011137815 A | 7/2011 |
| JP | 2011-149764 A | 8/2011 |
| WO | WO-97-037358 A1 | 10/1997 |

OTHER PUBLICATIONS

Japanese Office Action dated Mar. 6, 2019 in corresponding Japanese Application No. 2015-549447.

Japanese Office Action dated Nov. 10, 2017 in JP Application No. 2015-549447.

Swedish Office Action dated Oct. 25, 2017 in Swedish Application No. 1550799-9.

Abe et al., "Mitigation of SCC Initiation on BWR Core Internals by Means of Hydrogen Water Chemistry During Start-Up" Nuclear Science and Engineering 149.3, pp. 312-324, 2005, epubs.ans.org/?a=2497.

Hettiarachchi, "BWR Field Experiences with NobleChem", Pres. ICONE8 2-6, 2001, p. 10, www.iaea.org/inis/collection/NCLCollectionStore/_Public/33/003/33003512.pdf.

Bernoulli Equation, Hyperphysics, accessed Nov. 28, 2016, http://hyperphysics.phy-astr.gsu.edu/hbase/pber.html.

Regulate. Definition provided by Merriam-Webster, www.merriam-webster.com/dictionary/regulate.

Valves introduction, "Valve Functions and Basic Parts," accessed Nov. 28, 2016, http://160.75.46.2/staff/sogut/den322/Notes/Valves.pdf.

PCT Search Report and Written Opinion dated Mar. 13, 2014 issued in connection with corresponding PCT Patent Application No. PCT/US2013/073801.

Machine Translation and Notification of Reasons for Refusal issued in connection with corresponding JP Application No. 2015-549447 dated Jul. 24, 2018.

Japanese Office Action dated Nov. 26, 2020 in corresponding Japanese Application No. 2020-026392.

* cited by examiner

SYSTEM FOR HYDROGEN INJECTION FOR BOILING WATER REACTORS (BWRS) DURING STARTUP / SHUTDOWN

PRIORITY STATEMENT

This application is a divisional of U.S. application Ser. No. 13/724,474, filed Dec. 21, 2012, the entire contents of which is incorporated herein by reference.

BACKGROUND

Field

Example embodiments relate generally to nuclear Boiling Water Reactors (BWRs), and more particularly to a system and a method for injecting hydrogen into reactor support systems during periods of reactor startup and shutdown. The system is capable of providing hydrogen at variable pressures (including high pressures of about 1,100 psig) in order to match the changing operating pressures of the support systems throughout the startup and shutdown modes.

Related Art

Conventionally, Hydrogen Water Chemistry (HWC) systems 1 (see FIG. 1) inject hydrogen into feedwater systems at the suction of the condensate booster pumps or at the suction of the feedwater pumps (see injection point 2) of a Boiling Water Reactor (BWR). Injection of hydrogen into these locations helps mitigate Inter-Granular Stress Corrosion Cracking (IGSCC) in the recirculation piping and reactor internals. Specifically, the injected hydrogen causes a reduction in dissolved oxygen by lowering the radiolytic net production of hydrogen and oxygen in the core region of the reactor.

The conventional HWC system 1 includes a hydrogen source 4 which may be a liquid storage tank (with compressors and vaporizers) or bottles of hydrogen. The hydrogen source may also be electrolytically generated. A hydrogen filter 6 may filter the hydrogen prior to the hydrogen passing through a series of valves, which may include a pressure control valve 8, excess flow check valve 11, shutoff valves 10 and bypass valves 12. An air-operated control valve 14 may be used to isolate the hydrogen before entering a hydrogen injection module 16 that discharges hydrogen to conventional hydrogen injection points 2. Purge connections 70 throughout the system 1 are generally used for maintenance and safety purposes.

The conventional hydrogen injection points 2 are injection points located in lower-pressure systems (relative to the reactor), such as the suctions of the condensate booster pumps (85-160 psig) and the suctions of the feedwater pumps (400-650 psig). Because the pumps of these lower-pressure systems are not in service during the full reactor startup or shutdown (including emergency reactor shutdown, such as a reactor SCRAM), hydrogen therefore may not be injected at these conventional locations during startup and shutdown, as doing so would not allow hydrogen dissolution for efficient transport to the recirculation piping and/or reactor internals. Because IGSCC corrosion is more prevalent at lower operating temperatures (of about 200° F. to about 450° F., during reactor startup/heat-up to about 5% power), the reactor (and the reactor support systems) is at greater risk during startup and shutdown modes, thereby exacerbating the effects that are caused by an inability to inject hydrogen into the conventional injection points 2 during reactor startup and shutdown modes.

SUMMARY

Example embodiments provide a startup/shutdown hydrogen injection system (and associated method) for injecting hydrogen into BWR reactor support systems during periods of reactor startup and shutdown. Because the reactor (and the reactor support systems) experience temperatures and pressures that vary greatly as the reactor cycles through startup and shutdown modes (as a result of the reactor heat-up and cool-down), the hydrogen injection system provides hydrogen at a variable pressure that may match the operating pressures of these support systems at any period of time. Because the hydrogen injection system provides hydrogen to reactor support systems that also operate at potentially high pressures, the hydrogen injection system may boost the pressure of hydrogen beyond pressure levels normally associated with conventional HWC systems.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
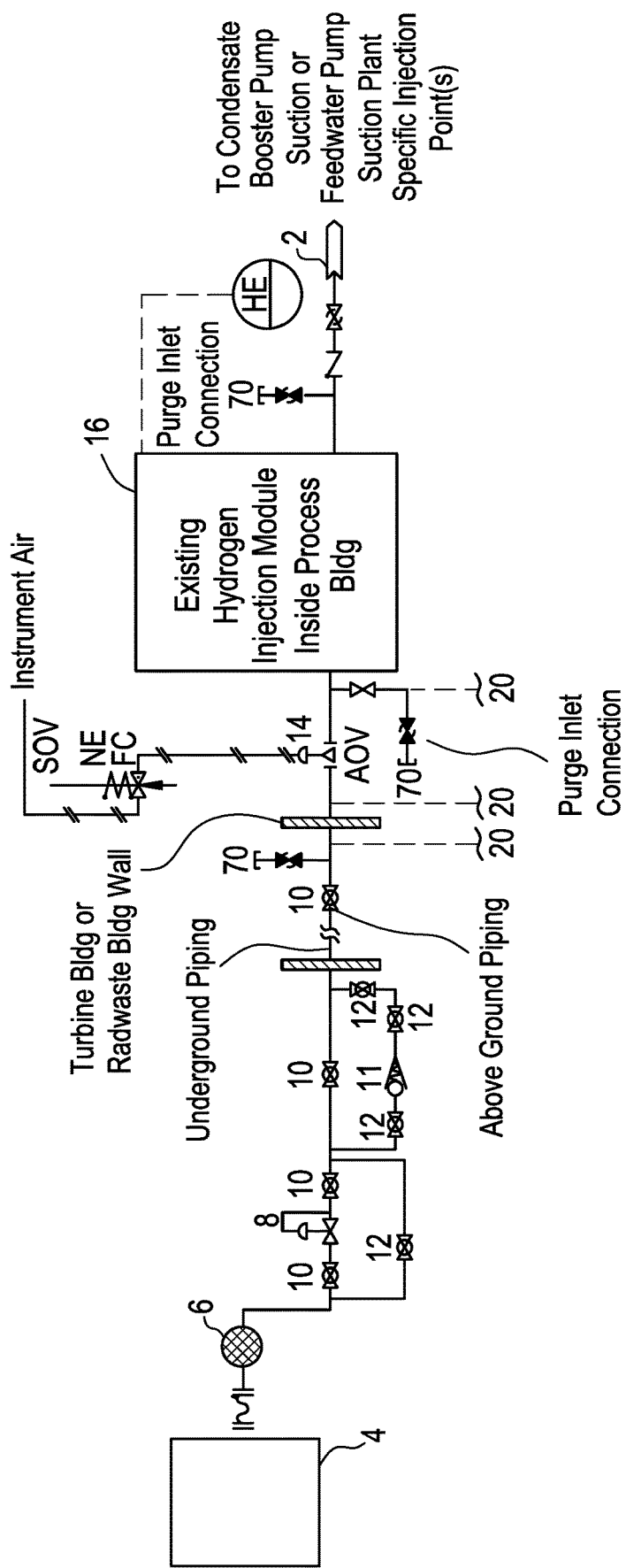
FIG. 1 is a piping and instrument (P&ID) diagram of a conventional hydrogen water chemistry (HWC) system.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
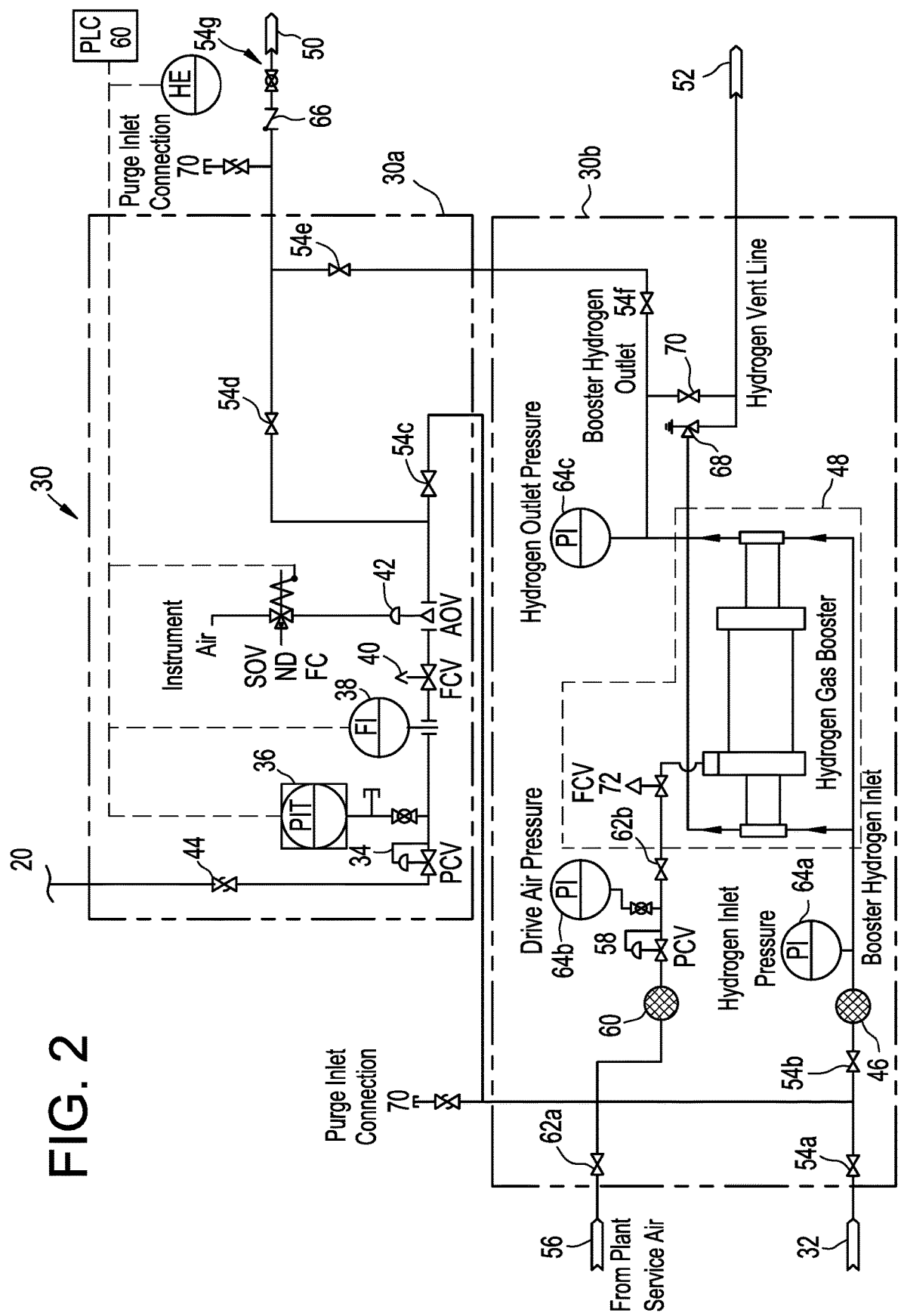
FIG. 2 is a P&ID diagram of a startup/shutdown hydrogen injection system, in accordance with an example embodiment.

FIG. 2 is a P&ID diagram of a startup/shutdown hydrogen injection system 30, in accordance with an example embodiment. The system may include one or more hydrogen sources. For instance, an optional dedicated hydrogen gas source 32 may be provided for the hydrogen injection system 30. The dedicated hydrogen gas source 32 may be small hydrogen gas bottles, a hydrogen gas truck, or liquid storage containing hydrogen. Alternative to a dedicated hydrogen gas source 32 (or, in addition to a dedicated hydrogen gas source 32), a connection 20 may be provided which may connect to an existing HWC system 1 (see optional connection points 20 on FIG. 1, which may, for instance, connect to HWC system 1 either upstream or downstream of air-operated valve 14, and inside or outside of the plant wall).

If a connection 20 between an existing HWC system 1 and the startup/shutdown hydrogen injection system 30 is used to supply hydrogen, flow control equipment may be provided on the connection 20. For instance, a pressure control valve 34, a pressure transmitter 36, a local flow indicator 38, a flow control valve 40 and an air-operated valve 42 may be provided in the connection line 20 to control the flowrate and pressure of hydrogen coming from the existing HWC system 1 into the startup/shutdown hydrogen injection system 30. A shutoff valve 44 may also be included to shut-off the flow of hydrogen into the hydrogen injection system 30.

Whether a connection between an existing HWC system 1 and the startup/shutdown hydrogen injection system 30 is used, or whether a dedicated hydrogen gas source 32 for the hydrogen injection system 30 is used, a hydrogen filter 46 may be provided to filter hydrogen gas prior to any pressurization of the hydrogen.

The hydrogen injection system 30 may further include a hydrogen gas booster 48 that may significantly increase the pressure of hydrogen which is to be injected into hydrogen injection point 50. The hydrogen gas booster 48 may be hydraulic or air-driven (pneumatic), and may be capable of increasing hydrogen pressure to any of a wide range of pressures, varying from about 0 psig to about 1,100 psig. By providing the hydrogen gas booster 48, the hydrogen injection system 30 may provide hydrogen to reactor support systems that experience a reactor water flow (at potentially high operating pressures of about 1,100 psig, and operating temperatures as low as about 200° F. when oxygen concentration in the reactor water is relatively elevated) during reactor startup and/or shutdown conditions (reactor "shutdown" including reactor scrams, hot/standby and/or hot/shutdown modes). For instance, hydrogen injection point 50 may include injections points in reactor support systems such as the reactor water cleanup (RWCU) return line or the feedwater recirculation lines of the BWR. Because these example reactor support systems experience reactor water flow during reactor startup and/or shutdown, and because these systems experience a wide range of pressures as the reactor cycles through startup and/or shutdown, the hydrogen gas booster 48 is particularly well equipped in increasing hydrogen pressure that is appropriate for these example service points.

The hydrogen gas booster 48 may be located downstream of the flow controls (including any one of the pressure control valve 34, pressure transmitter 36, flow indicator 38, flow control valve 40 and air operated valve 42), as doing so allows the flow control equipment to be a lower pressure class (and thereby less expensive). The hydrogen gas booster 48 may be pneumatically operated via a plant service air 56 connection. A pressure control valve 58 may be used to control the pressure of service air entering the hydrogen gas booster 48. An air filter may be used to filter the inlet air. Service air shutoff valves 62a/62b may be included in the air inlet line to close the air inlet line (to service the hydrogen gas booster 48, for instance). The hydrogen gas booster 48 may include a air flow control valve 72 to throttle the air flow to the booster to subsequently increase the hydrogen pressure out of the booster 48. The flow control valve 72 may be automatically or manually controlled.

A number of system shut-off valves 54a-54g may be provided to manage hydrogen flow through desired portions of the system 30 for added flexibility. For instance, when hydrogen is being injected to systems requiring relatively lower pressure, the hydrogen gas booster 48 may not be required. In such a scenario, if the conventional hydrogen source 4 (FIG. 1) is being used to supply hydrogen to injection point 50, shutoff valves 54c, 54e and 54f may be closed, while shutoff valves 54d and 54g may be opened. Alternatively, dedicated hydrogen gas source 32 may be used to supply lower-pressure hydrogen by closing shutoff valves 54b, 54e and 54f (to bypass hydrogen gas booster 48), and opening shutoff valves 54a, 54c, 54d and 54g to hydrogen in injection point 50.

In scenarios where higher-pressure hydrogen service is desired, shutoff valve 54b may be opened, allowing hydrogen from hydrogen source 4 (through opened shutoff valve 54c) or hydrogen source 32 (through opened shutoff valve 54a) to enter the hydrogen gas booster 48. Hydrogen leaving the hydrogen gas booster 48 may be directed to hydrogen injection point 50 through shutoff valves 54e, 54f and 54g.

Local pressure indicators 64a-64c may be included to confirm the operating pressure of hydrogen and/or service air within the system. Especially in the case of high pressure hydrogen injection points 50, a check valve 66 may be included in the hydrogen injection line 50 to ensure that fluids from the high pressure systems to not backup into the hydrogen injection system.

The startup/shutdown hydrogen injection system 30 may be provided on two separate skids 30a/30b for convenience, with the relatively lower pressure hydrogen equipment being predominantly included on one skid 30a and the relatively higher pressure hydrogen equipment being predominantly included on the other skid 30b.

A safety-relief valve 68 may be provided on the hydrogen gas booster 48 to vent hydrogen (to vent line 52) at times when the hydrogen gas booster 48 may become over-pressurized. Purge connections 70 throughout the system 30 may also be provided for maintenance and safety purposes.

Figure 3:
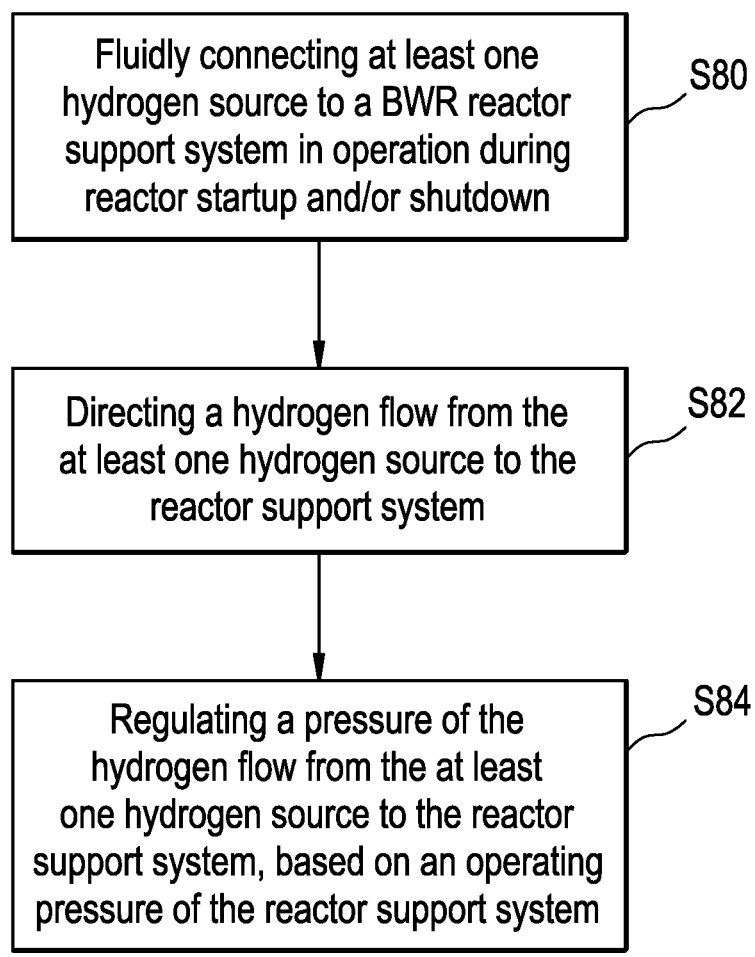
FIG. 3 is a flowchart of a method of making and using a startup/shutdown hydrogen injection system, in accordance with an example embodiment.

FIG. 3 is a flowchart of a method of making and using a startup/shutdown hydrogen injection system 30, in accordance with an example embodiment. The method may include a step S80 of fluidly connecting at least one hydrogen source to a BWR reactor support system in operation during periods of reactor startup and/or shutdown. This may be accomplished, for instance, by providing piping or tubing between the hydrogen source and the BWR reactor support system. It should be understood that a support system which is "in operation" during startup and/or shutdown relates to a system which provides a reactor water fluid flow through the system during periods when the reactor is starting up and shutting down (thereby offering a transport medium for the injected hydrogen to then be transported to the recirculation piping and/or reactor internals during startup and/or shutdown modes).

The method may further include a step S82 of directing a hydrogen flow from the at least one hydrogen source to the reactor support system. This may be accomplished, for instance, by opening valve connections in piping/tubing located between the hydrogen source and the reactor support system. The opening of the valve(s) may be accomplished via a controller, such as PLC 60 (see FIG. 2).

The method may further include a step S84 of regulating a pressure of the hydrogen flow from the at least one hydrogen source to the reactor support system, based on an operating pressure of the reactor support system. Specifically, the pressure of the hydrogen flow may be regulated to match the operating pressure of the reactor support system, with the understanding that the operating pressure may change while the reactor cycles through the startup and/or shutdown modes. The regulating of the pressure of the hydrogen flow may be accomplished via a controller, such as PLC 60 (see FIG. 2), which may compare a measured pressure at hydrogen injection point 50 against measured pressures at the pressure transmitter 36 or pressure indicator 64c (for instance) in order to regulate the pressure of the hydrogen being directed to the hydrogen injection point 50.

The hydrogen injection system 1 may include a programmable logic controller (PLC) and/or data acquisition system 60 that may be used to determine the rate and pressure for supplying hydrogen to injection point 50 (based upon a measure of the required injection point 50 pressure). Therefore, the PLC and/or data acquisition system 60 may be in communication with the control hardware shown in both the lower and higher pressure skids 30a/30b (not all connections shown in FIG. 2). The PLC and/or data acquisition system 60 may also control the hydrogen gas booster 48 and any system valves within the hydrogen injection system 30.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A system, comprising:
   at least one first BWR support system that operates during a reactor startup mode or a reactor shutdown mode; and
   a hydrogen injection system fluidly connected to the at least one first BWR support system, the hydrogen injection system including
   at least one hydrogen source,
   flow control equipment, the flow control equipment including automatic flow controls,
   pressure control equipment,
   the pressure control equipment being configured to
      measure a first pressure of a hydrogen flow at an in-line hydrogen booster and at least one second pressure of the hydrogen flow at a hydrogen injection point for the at least one first BWR support system, and
      automatically control a pressure and a flowrate of the hydrogen flow traveling through the in-line hydrogen booster and towards the at least one first BWR support system, via a use of the automatic flow controls, based on the first pressure and the at least one second pressure.

2. The system of claim 1, wherein the at least one first BWR support system experiences a reactor water fluid flow through the at least one first BWR support system during the reactor startup mode or the reactor shutdown mode.

3. The system of claim 1, wherein the at least one first BWR support system is at least one of a Reactor Water Cleanup (RWCU) return line or a Feedwater Recirculation line.

4. The system of claim 1, wherein the pressure control equipment is further configured to match the pressure of the hydrogen flow to an operating pressure of the at least one first BWR support system, the operating pressure of the at least one first BWR support system being variable during the reactor startup mode or the reactor shutdown mode, the at least one second pressure corresponding to the operating pressure.

5. The system of claim 4, wherein the hydrogen injection system further includes,
   a hydrogen booster configured to boost the pressure of the hydrogen flow.

6. The system of claim 5, wherein the hydrogen booster is one of a hydraulically-driven booster or a pneumatically-driven booster.

7. The system of claim 5, wherein the hydrogen booster is configured to boost the pressure of the hydrogen flow to a variable pressure of up to 1,100 psig.

8. The system of claim 5, wherein the flow control equipment is located upstream of the hydrogen booster.

9. The system of claim 8, wherein the flow control equipment is a lower pressure class than the hydrogen booster.

10. The system of claim 1, wherein the hydrogen source is at least one of a hydrogen gas bottle, a hydrogen gas truck or a liquid hydrogen storage structure.

11. The system of claim 1, wherein the at least one first BWR support system experiences fluid operating temperatures as low as about 200° F. and fluid operating pressures as high as 1,1000 psig during the reactor startup mode or reactor shutdown mode.

12. The system of claim 1, wherein the pressure control equipment is further configured to
   compress the hydrogen flow to boost the pressure of the hydrogen flow using an in-line hydrogen booster, the in-line hydrogen booster being located between the at least one hydrogen source and the at least one first BWR support system.

13. The system of claim 12, wherein the automatic flow controls include at least one air operated valve.

14. The system of claim 13, wherein the at least one air operated valve includes at least one first automatically controlled actuator for the at least one air operated valve.

15. The system of claim 14, wherein the at least one first automatically controlled actuator is an air operated actuator.

16. The system of claim 12, wherein the automatic flow controls are located upstream of the in-line hydrogen booster, the automatic flow controls being a lower pressure class than the in-line hydrogen booster.

17. The system of claim 12, wherein the pressure control equipment is configured to measure the first pressure of the hydrogen flow at the in-line hydrogen booster by,
 measuring the first pressure at a location that is at least one of directly before the in-line hydrogen booster or directly after the in-line hydrogen booster.

18. The system of claim 12, wherein the pressure control equipment is further configured to automatically control the pressure and the flowrate by,
 comparing the first pressure to the at least one second pressure.

19. The system of claim 12, wherein,
 the at least one first BWR support system includes a first BWR support system and a second BWR support system, and
 the at least one second pressure includes a second pressure at a first hydrogen injection point of the first BWR support system and a third pressure at a second hydrogen injection point of the second BWR support system, and
 the pressure control equipment is further configured to regulate the pressure of the hydrogen flow by,
  comparing the first pressure to the second pressure and the third pressure, and
  automatically controlling the flowrate of the hydrogen flow based on the comparing of the first pressure to the second pressure and the third pressure.

20. The system of claim 19, wherein the second pressure equals a first operating pressure of the first BWR support system and the third pressure equals a second operating pressure of the second BWR support system.

* * * * *